US006771396B1

(12) United States Patent
Cheatle et al.

(10) Patent No.: US 6,771,396 B1
(45) Date of Patent: Aug. 3, 2004

(54) DOCUMENT IMAGING SYSTEM

(75) Inventors: Stephen Philip Cheatle, Bristol (GB); David Arthur Grosvenor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 544 days.

(21) Appl. No.: 09/679,205

(22) Filed: Oct. 4, 2000

(30) Foreign Application Priority Data

Oct. 28, 1999  (EP) .............................................. 99308537

(51) Int. Cl.[7] .......................... H04N 1/04; H04N 1/387; H04N 5/225
(52) U.S. Cl. ...................... 358/474; 358/488; 358/497; 358/450; 358/909.1; 348/218.1
(58) Field of Search .................................. 358/474, 450, 358/497, 496, 494, 488, 486, 479, 909.1; 348/96, 218.1, 552; 382/318, 319, 324, 313

(56) References Cited

U.S. PATENT DOCUMENTS 4,393,410 A * 7/1983 Ridge et al. ................. 358/488
4,485,409 A   11/1984 Schumacher
5,515,181 A   5/1996 Iyoda et al.
5,663,806 A * 9/1997 Grise et al. ................. 358/474

FOREIGN PATENT DOCUMENTS

| EP | 0 743 784 | 11/1996 |
| WO | 84/02046 | 5/1984 |

* cited by examiner

*Primary Examiner*—Cheukfan Lee

(57) ABSTRACT

A method of calibrating an image capture system and subsequently capturing an image of a document with an electronic camera by capturing a plurality of overlapping image tiles of the document at different locations over a support surface and with a predetermined degree of overlap, and joining the tiles into a composite image after correcting for expected distortion and overlap in accordance with transform data obtained by capturing a plurality of image tiles of a registration array having a plurality of individually identifiable location identification features with a predetermined orientation and spacing amongst the features and determining distortion for each tile from the identification features.

11 Claims, 3 Drawing Sheets

DOCUMENT IMAGING SYSTEM

FIELD OF THE INVENTION

The present invention relates to the use of an electronic camera in a platenless document imaging system in which the document image is a composite image formed from a mosaic of overlapping images captured by the camera.

BACKGROUND OF THE INVENTION

In recent years, document scanners have become commonplace. Although these work well and are relatively inexpensive, a flatbed or platen-based document scanner occupies a significant amount of scarce desk space.

The use of a camera to take a photograph of a document consisting of text and/or images offers one way of dealing with the problem of wasted desk space. An electronic camera would need to have a detector with about 40 megapixel resolution in order to have a resolution over an A4 sized document comparable with that of the resolution of a typical document scanner, typically about 24 dots/mm (600 dpi). Such high-resolution detectors cost much more than the total cost of a desktop scanner.

As a result, it has been proposed to use an electronic camera with an actuator to scan the field of view of the camera over a document, and so form a composite image of the document from a number of overlapping image tiles. This permits less expensive lower resolution detector arrays to be used to build up an image of a document with a resolution comparable with that of a conventional document scanner. See, for example, patent document U.S. Pat. No. 5,515,181.

A problem with this approach is the fact that the image tiles must have some overlap, because it is impractical to use an actuator which moves the camera so precisely that tiles will fit together with no overlap. The conventional approach to fitting together overlapping tiles involves identifying features in the image of one tile in an overlap region and matching this against a corresponding feature in an adjacent tile's overlap region.

This feature matching approach suffers from various difficulties. First, computational algorithms to identify and match features are relatively slow compared with the process of gathering the images, which limits the throughput of a scanning camera document imaging system. Second, many documents have significant areas of blank space, for which it is not possible to match features. This necessitates the use of larger overlap areas to increase the likelihood that there will be suitable matching features in the overlap areas, with the result that more images must be captured. Third, it is possible that features will be incorrectly matched, particularly for text based documents in which common letters repeat frequently.

Another problem is that an image from an inexpensive camera will have some image distortion, particularly towards the edges of the field of view. The distortion is therefore strongest in the overlap region between tiles, which makes it more difficult to achieve a good overlap simply by matching features. As a result, it may be necessary to match several features over the extent of the overlap area to get a good fit between adjacent tiles.

As a result of problems such as these, scanning camera-based document imaging systems cannot yet compete with flatbed or platen-based document scanning systems.

The present invention addresses these and other problems.

SUMMARY OF THE INVENTION

In one embodiment disclosed herein, a method of calibrating an image capture system and subsequently capturing an image of a document comprises providing an electronic camera for imaging a portion of a document, an actuator for moving the camera over a document support surface and for cooperating with the camera to capture a plurality of overlapping image tiles of the document at different locations over the support surface and with a predetermined degree of overlap, and electronic processing means for joining the plurality of image tiles into a composite image of the document by generating from tile data points associated with each tile a corrected array of tile data points that correct for the expected distortion and predetermined overlap of neighboring image tiles in accordance with transform data for each image tile related to the predetermined overlap and to expected distortion for each image tile; providing a two-dimensional registration array within the field of view of the camera across an area corresponding with the document to be imaged, the registration array having a plurality of individually identifiable location identification features with a predetermined orientation and spacing amongst the features; using the camera to capture a plurality of overlapping image tiles of the registration array at predetermined locations and predetermined overlap, the locations and overlap corresponding to those to be used with the document to be imaged, each image tile having an array of tile data points that cover a plurality of location features; identifying for each image tile a plurality of individual location identification features, associating with the features particular tile data points and from the predetermined orientation and spacing of the specific features determining from the tile data points if there is any image distortion in that image tile; and generating the transform data for each image tile from the identity of the location identification features and the determined distortion; and wherein capturing the image subsequently comprises placing a document on the document support surface; positioning the camera above the document support surface; capturing a plurality of image tiles of the document at a plurality of different predetermined locations over the support surface with a predetermined degree of overlap between neighboring image tiles, each image tile having an array of tile data points and each predetermined location having a predetermined camera field of view; and causing the electronic processing means to generate from the transform data and the tile data points associated with each tile a corrected array of tile data points that correct for the expected distortion and predetermined overlap of neighboring image tiles, and to join the plurality of image tiles into a composite image of the document.

Using the camera to capture the plurality of overlapping image tiles may involve using the actuator to move the camera between image tiles in the same order as for the document to be imaged. The camera may further include a focus mechanism, the transform data may include separate data for different focus settings, and the method may further comprise focusing the camera on the document and selecting the transform data according to the focus setting.

Accordingly, the invention provides an image capture system, comprising: an electronic camera with an electronic detector and a lens with a field of view for imaging on the detector a portion of a document; an actuator for moving the camera field of view over a document support surface, the camera and the actuator co-operating so that a plurality of overlapping image tiles of a document can be captured at different locations over the support surface, each image tile having an array of tile data points and being subject to some expected perspective and/or camera distortion relative to the support surface; and electronic processing means by which the plurality of image tiles may be joined into a composite image of the document; characterised in that:

i) for each image tile the camera field of view relative to the support surface and the degree of overlap between neighbouring image tiles are predetermined;

ii) the electronic processing means includes a memory which stores transform data for each image tile, the transform data relating both to the expected distortion and to the predetermined overlap between image tiles; and iii) the processing means is adapted to use the transform data to generate from the tile data points a corrected array of tile data points with said distortion corrected and with the corrected image tiles correctly overlapped with respect to neighbouring corrected image tiles to form a composite image of the document.

The image capture system may include a support by which the camera can be positioned to view a document support surface on which the document may be placed in view of the camera.

Because the camera field of view relative to the document support surface and the overlap are predetermined, the relative orientation and distortion of each image tile with respect to its neighbours will be repeatably the same, to within some residual positioning error for the camera actuator. Therefore, if the system is used to image a document more than one time, without moving the document with respect to the document support surface, each of the image tiles will be substantially the same with corresponding image tiles from one time to the next.

Therefore, as long as the positioning and movement of the camera is repeatable, transform data needs only to be generated and stored once. The transform data then relates each image data point of each image tile to a corrected image data point. The corrected image data point of one tile at a point in an overlap area will then correspond closely to a corresponding corrected image data point a similarly overlapping area of an adjacent or neighbouring tile.

The invention also provides a method capturing an image of a document using an image capture system according to the invention, in which the method comprises the steps of:

a) positioning the camera above the support surface and placing a document on the support surface within view of the camera;

b) capturing a plurality of overlapping image tiles of the document at different locations over the support surface, each image tile having an array of tile data points; characterised in that in step b) the different locations are predetermined so that for each image tile the camera field of view relative to the support surface and the degree of overlap between neighbouring image tiles are predetermined, and in that the method comprises the steps of:

c) using the electronic processing means to generate from the transform data and the tile data points a corrected array of tile data points in order to correct said distortion and correctly overlap each corrected image tile with respect to neighbouring corrected image tiles; and d) joining neighbouring corrected image tiles to form a composite image of the document.

The system may include a mount by which the camera may be mounted over the document support surface, which may be a desk or other such work surface. The mount may position the camera either directly above, or above and to one side of the work surface. If the camera is mounted to one side of the work surface, then the actuator is most conveniently a two-axis tilt and pan actuator.

Most commonly, the document support surface will be a work surface, such as a desktop.

The accuracy of many types of actuator is limited by mechanical play or backlash in the actuator driving mechanism. Such imperfections can be minimised if the actuator always follows the same pattern of movement as the camera field of view is moved from a start position over the document support surface, and then back to the original start position. In this way, the relative orientation between image tiles and the degree of overlap between neighbouring tie can be made most accurate. The absolute orientation of the set of the image tile with respect to the document support surface is then a secondary consideration, as long as perspective distortion does not change significantly from one pass of the camera over a document to the next pass.

In a preferred embodiment of the invention, prior to storing of the transform data in the memory, the method comprises the steps of:

e) providing a two-dimensional registration array within the field of view of the camera across an area corresponding with the document to be imaged, the registration array having a plurality of individually identifiable location identification features with a predetermined orientation and spacing amongst the features;

f) using the camera to capture a plurality of overlapping image tiles of the registration array at predetermined locations and predetermined overlap, said locations and overlap corresponding to those to be used with the document to be imaged, each image tile having an array of tile data points that cover a plurality of location features;

g) identifying for each image tile a plurality of individual location identification features, associating with said features particular tile data points and from the predetermined orientation and spacing of the specific features determining from the tile data points if there is any image distortion in that image tile;

h) generating from the identity of the location identification features and the determined distortion the transform data for each image tile.

The transform data can therefore be derived empirically in an initial calibration of the image capture system. Because the calibration data is generated directly from the same equipment that will be used to image the document, the calibration will be naturally close to the actual performance of the image capture system. It is therefore unnecessary to generate the transform data using a mathematical model of the camera and camera scanning system. In use of the image capture system, the use of the transform data to correct an image tile to achieve a correct overlap between neighbouring tiles involves relatively little computational effort compared with aligning image tiles solely by matching identifiable features in the imaged document.

It is particularly advantageous if, in the generation of the transform data, when the camera is used to capture a plurality of overlapping image tiles of the registration array, the actuator moves the camera between tiles in the same order as for the document to be scanned. Therefore, any repeatable imperfections in the movement of the camera between image tiles will automatically be accounted for in the transform data.

Preferably, there are at least four location identification features that are identified for each image tile.

Preferably each image tile captured of the registration array has at least one unique location identification feature. Because the spacing and orientation between location identification features is known, this then allows the separation and orientation between any two image tiles of the registration array to be determined solely from the image tile data points of the registration array.

One way of providing a registration array is if the location identification features are printed on a card. The card may be used just in a manufacturing environment. However, if the mount has a location feature for correctly orienting the card and document with respect to the camera field of view, then the card may be used either by a user of the image capture system, or by a service engineer should the system need to be recalibrated. The location feature may be a right angle bracket for aligning a right angle corner of a document to be scanned.

The electronic camera will have some depth of focus defined by the lens, and aperture setting if any. The portion of the document being imaged will need to lie within this depth of focus in order to achieve optimum resolution of the document. If the document is thin, then it will effectively lie in the plane of the document support surface. However, if the document is thick, then the calibration of the transform data may not be valid, for example because of different perspective distortion. One way to overcome this is if the actuator is arranged to rotate the camera about the optical centre of the lens as the camera field of view is moved over the support surface. Then, it is only necessary to have one set of transform data, as this will apply to different focus displacement away from that for the document support surface.

However, such a lens introduces additional cost. Therefore, the actuator may not be arranged to rotate the camera about the optical centre of the lens as the camera field of view is moved over the support surface. In this case, the camera includes a focus mechanism, and the transform data includes separate data for different focus settings. The method of imaging a document then comprises the additional steps of: focussing the camera on the document; and selecting the transform data according to the focus setting. The focus setting may be determined from the lens position, an optical focus sensor or by other means, for example an ultrasonic focus detector.

BRIEF DESCRIPTION OF THE DRAWINGS

The invention will now be described by way of example, with reference to the accompanying drawings, in which.

DETAILED DESCRIPTION

Figure 1:
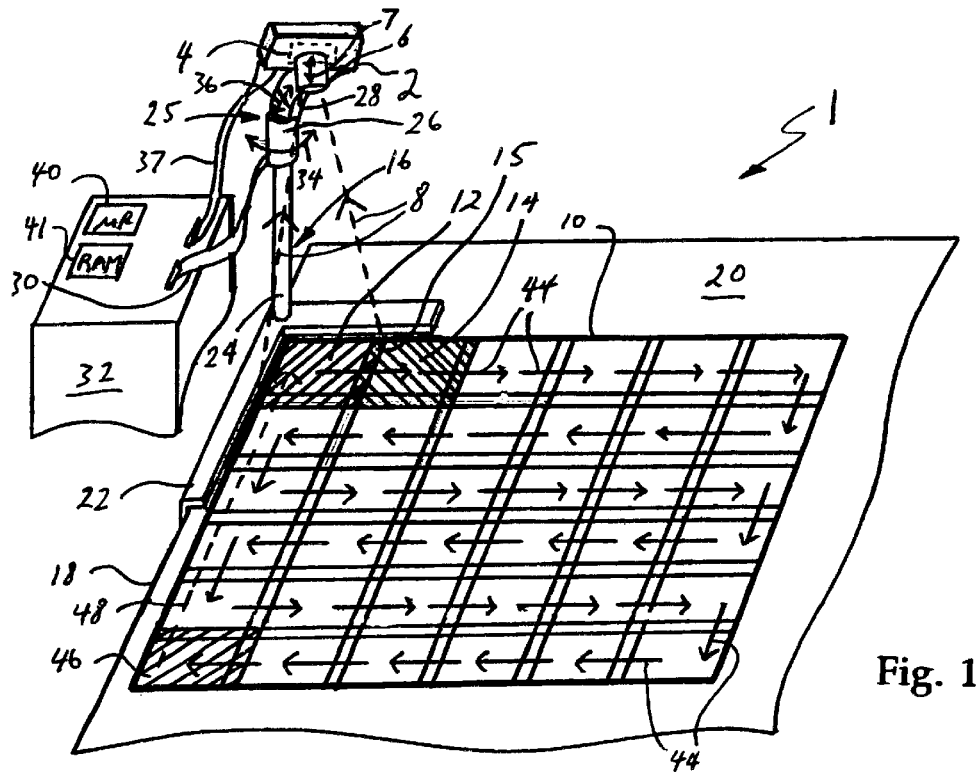
FIG. 1 is a schematic drawing of an image capture system according to the invention, showing how an electronic camera images a document with a predetermined pattern over overlapping image tiles.

With reference to FIG. 1, an image capture system 1 for imaging a document 10, for example a document of A4 size, includes a conventional electronic camera 2 with a CCD detector array 4 having a relatively moderate resolution of 480 by 640 pixels. A lens 6 with an autofocus mechanism 7 has a field of view 8 directed at a portion 12 of the document 10, shown in outline and cross-hatching. A total of thirty-six such portions cover the document 10. Each portion overlaps slightly with its neighbouring portions, as shown by the different angled cross hatching shown for one neighbouring portion 14. The tiles 12 and 14 therefore overlap in an overlap area 15.

The camera 2 is mounted atop a stand 16 that is affixed to an edge 18 of a work surface 20. The stand 16 has at its base a right-angled bracket 22 that is used both to fix the stand 16 to the work surface 20 and to align correctly the document 10 with respect to the camera 2. A cylindrical post 24 extends vertically from the right-angled corner of the bracket 22. Between the top of the post 24 and the camera 2 is a motorised actuator mechanism 25. The mechanism 25 comprises atop the post 24 a cylindrical joint 26 that is coaxial with the post 24, and above this an arcuate tilting arm 28 which is connected to the base of the camera 2. The actuator mechanism is connected by a ribbon cable 30 to a controller unit 32, which may, for example, be an expansion card in a personal computer. The cylindrical joint 26 can rotate 34 the camera about a vertical axis, and the arcuate arm 28 can rotate 36 the camera about a horizontal axis.

Alternatively, if the camera is mounted directly above the document, for example being roughly centered above the document, then the actuator may have two horizontal axes of rotation.

Figure 2:
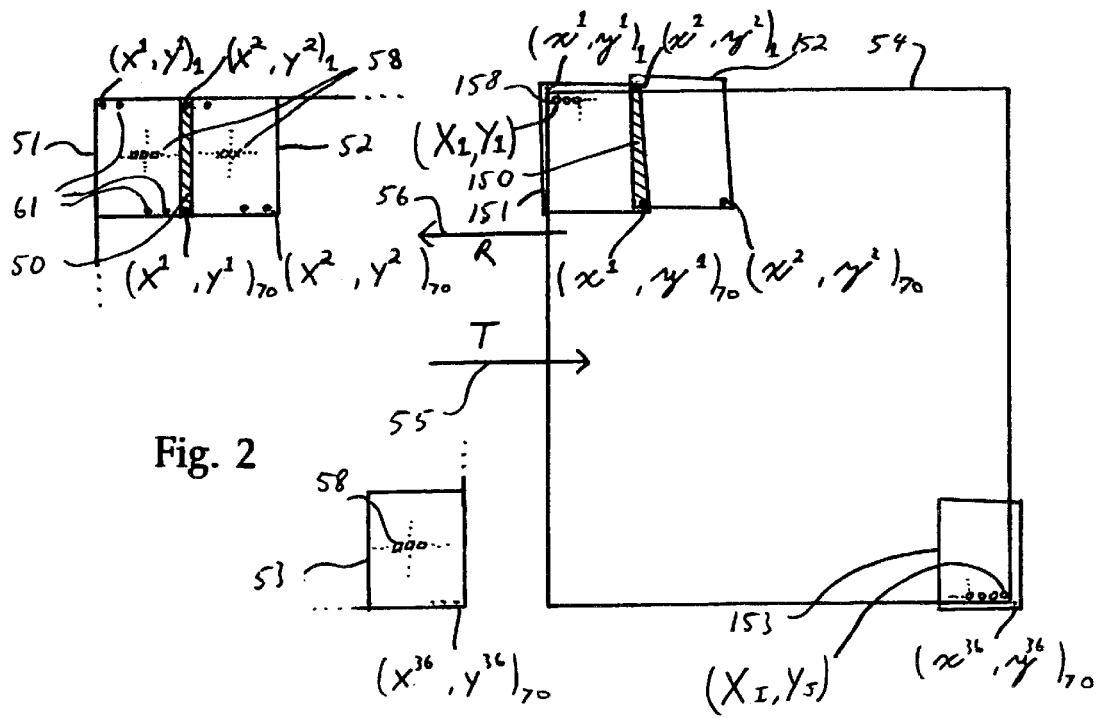
FIG. 2 is a diagram showing how transform data can be used to correct distortion in the image tiles, and correctly orient and overlap image tile data in neighbouring tiles to form a composite image of the document.

The controller unit 32 is connected by a second ribbon cable 37 to the electronic camera 2 in order to control the operation of the camera, and in particular as shown in FIG. 2, to download from the camera thirty-six overlapping image tiles 51,52,53 taken of the document 10. The controller unit 32 will have a microprocessor ($\mu$P) 40, and a memory (RAM) 41 and may, of course, be connected to a conventional removable storage device and display (not shown).

Optionally, some of the functions of the controller unit 32, such as the microprocessor 40 and memory 41 may be incorporated in the electronic camera 2.

As shown in FIG. 1, the camera lens 6 is in a start position in which the lens 6 looks downwards nearly vertically onto the portion 12 of the document 10 closest to the corner of the angle bracket 22. The camera 2 is stationary when the controller unit 32 captures an image of each document portion 12,14. Between captured images the actuator 25 is controlled by the controller unit 32 to move between document portions according to a predetermined pattern, illustrated by head-to-tail arrows 44, until a last document portion 46 is reached, whereupon the camera 2 is moved back to the start position, as shown by dashed line arrow 48. During this movement, the overlap areas 15 between each document portion 12,14,46 are predetermined, as are therefore, also the corresponding overlap areas 50 between image tiles 51,52,53.

Because none of the document portions 12,14,46 is presented directly face-on to the lens 38, the captured image of each image tile 51,52,53 will have some perspective distortion, also called "keystone" distortion. Therefore, both the document portions 12,14,46 and the overlap areas 15 will not in general be rectangular (as drawn for clarity), but trapezoidal. In addition, unless an expensive lens is used, the image on the detector 4 will in general have some lens distortion, most notably radial distortion.

In principle, the expected distortions of the image tiles can be calculated from a theoretical model of the imaging system and by measuring carefully the actual position of the lens 6. In practice, it is difficult to accurately model the performance of the lens 6 with respect to the document 10. Very small errors in the model can generate significant discontinuities in the composite image if the correction transforms are derived from the model.

Figure 3:
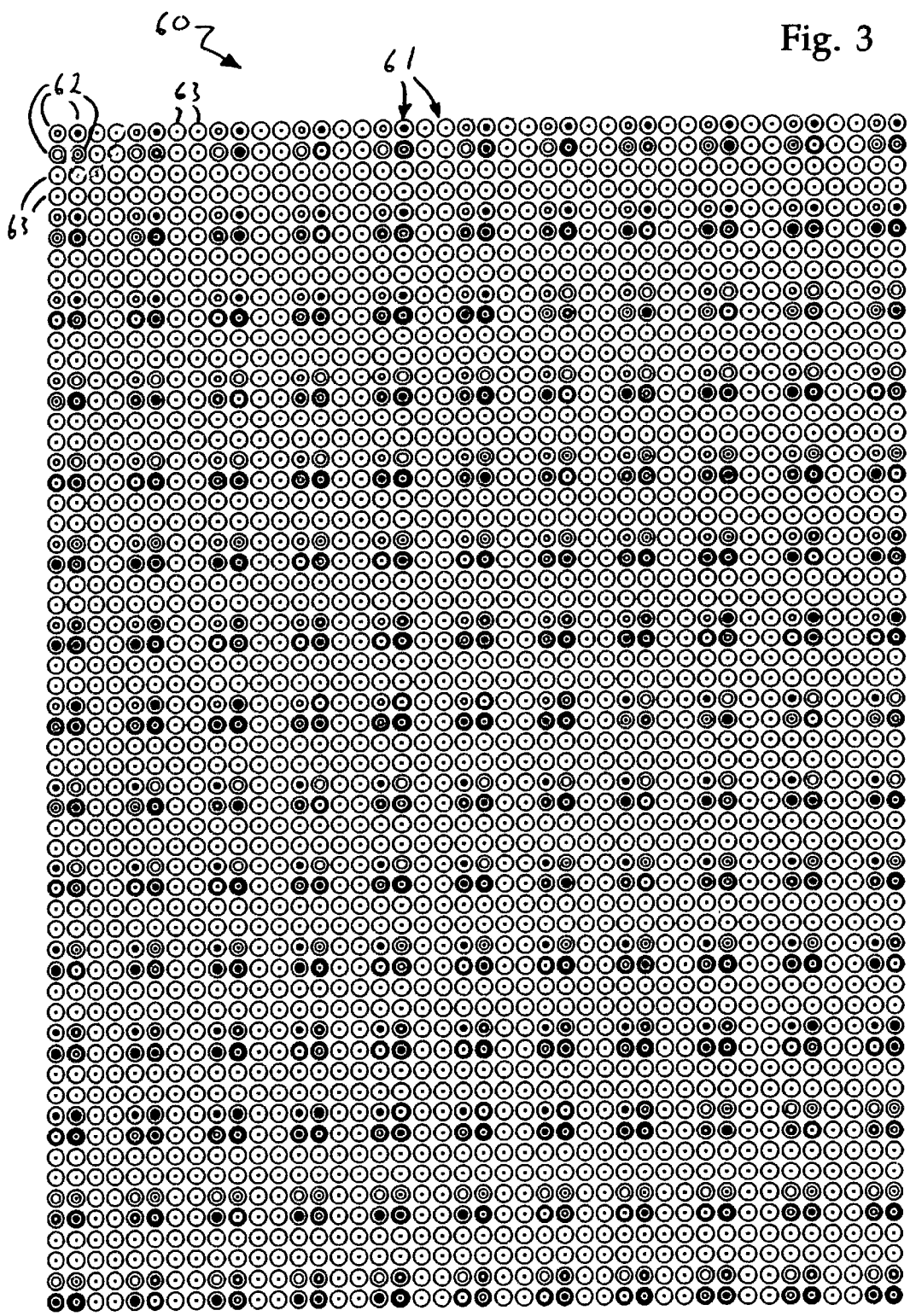
FIG. 3 is a preferred embodiment of a registration array having numerous unique location identification features used in the generation of the transform data.
Figure 4:
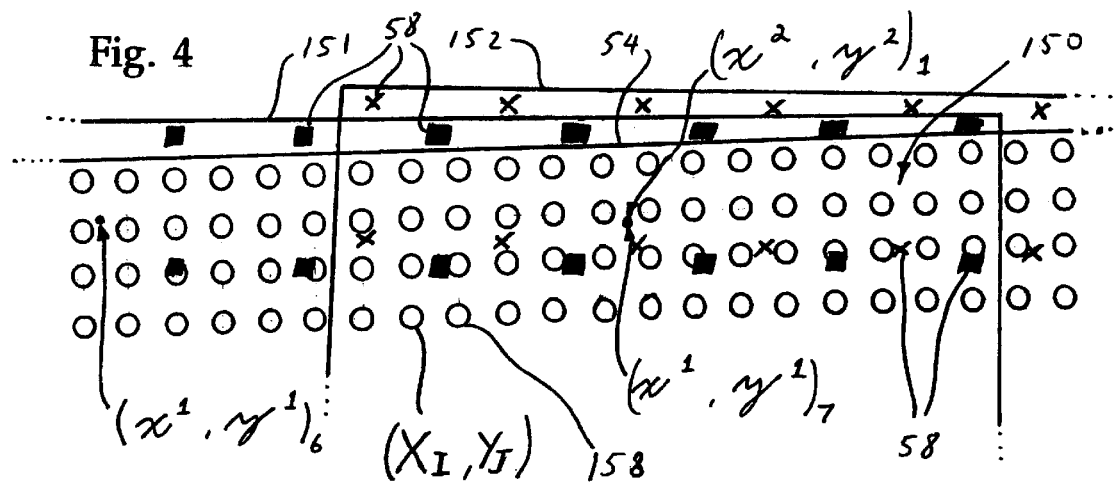
FIG. 4 is an enlarged diagram of part of FIG. 2, showing corrected image tile data in the region of overlapping image tiles.

FIGS. 2, 3 and 4 show how empirically derived transform data can be used to perform the necessary corrections, provided that the overlap areas 15 and orientations between imaged document portions 12,14,46 are repeatable each time the overlapping document images 51,52,53 are captured. In FIG. 2, each of the thirty-six image tiles 51,52,53 captured by the detector array 4 has pixels whose (x,y) co-ordinates are represented by $(x^1,y^1)$ to $(x^{36},y^{36})$. Each of the image tiles 51,52,53 can make a correct contribution to a composite image 54 of the document 10 after a transform operator (T) has transformed 55 the (x,y) co-ordinates to those (x, y) for corresponding corrected image tiles 151,152,153. Each of the corrected image tiles 151,152,153 will then have predetermined overlap areas 150 that correspond with overlap areas 50 of the original image tiles 51,52,53.

The transform data is empirically derived with the use of a registration array 60 shown in FIG. 3, which may be printed on a portable substrate such as paper or card.

The registration array 60 in use is slightly larger than A4 size and comprises a square array of circular features 61, which have been devised so that pattern recognition software can both quickly determine the centre of each circular feature 61, and the identity of each feature. Because the layout of the pattern is known, the orientation and spacing between the centres of any two of the circular features 61 can be calculated. On a six-by-six array, over the A4 registration array 60, each image tile 51,52,53 will have at least about 70 such circular features 61. If it is desired to image documents larger or smaller than A4 size, then of course the registration array can be made larger.

So that these features 61 are individually identifiable, the array has at regular intervals on a square grid a square grouping 62 of four variable and identifiable circular patterns, each of which consists of one of eight different possible patterns of alternating white and black concentric rings or circles. Image processing software can readily measure the extent and number of the circular white and dark bands, and so unambiguously determine which of the eight possible circular features has been identified, as well as identifying the centre of each of the variable features 62. As a check on the veracity of the identified pattern, in none of the groupings 62 of four circular features does the same type of ring feature appear more than once. Any particular pattern can only validly occur in one of the four possible rotational orientations. There are therefore (8·7·6·5)/4=420 different possible combinations, only 155 of which are used in the illustrated registration array 60.

The groupings of four identifiable circular features 62 are separated by pairs of rows and columns of uniform circular features 63. The spacing of the identifiable groupings 62 is such that there is at least one, and in the present example at least four, such groupings in each captured image tile of the registration array 60.

Once the identifiable groupings 62 have been identified in such a captured image tile 51,52,53, the other uniform features 63 can be identified from the known arrangement of these uniform features 63. The result is that each captured image tile 51,52,53 of the registration array 60 will have approximately 70 to 80 identification features, indicated for simplicity below simply as the number 70.

FIGS. 2 and 4 show how the apparent locations of the registration array features, designated (x$^n$,y$^n$) for the n'th image tile, are used to generate transform data that allows the captured image tiles 51,52,53 to be transformed (T) 55 to a composite image 54 of the document 10. First, the apparent locations of the registration array elements (x$^n$,y$^n$)$_{1-70}$ on the detector array are deduced from the circular shape of each location identification feature 61. These locations (x$^n$,y$^n$)$_{1-70}$ will not in general coincide with the centres of the pixel elements 58 of the detector array 4. The problem to be solved is how to transform these apparent locations into 'true' locations (x$^n$,y$^n$)$_{1-70}$ for the composite image 54, using the known position and orientation of the registration array features 61.

Although the number of location identification features 61 identified for each captured image tile 51,52,53 is preferably at least four, a more accurate transform T can be generated if the number of location identification features 61 is about 60 to 80 for each image tile 51,52,53. The reason for this is as follows.

Given a set of k point correspondences of the form $(x^n,y^n)_{1-k}$ to $(x\,'',y\,'')_{1-k}$ where k≧4, we require a perspective and distortion transform model which transforms each point (x,y) into its corresponding point (x,y).

Using homogeneous co-ordinates, as is standard practice in computer graphics and image warping, we can represent this transform by a three-by-three matrix:

$$\begin{pmatrix} u \\ v \\ w \end{pmatrix} = \begin{pmatrix} a_{11} & a_{12} & a_{13} \\ a_{21} & a_{22} & a_{23} \\ a_{31} & a_{32} & 1 \end{pmatrix} \begin{pmatrix} x \\ y \\ 1 \end{pmatrix}$$

where x=u/w and y=v/w.

The matrix has eight unknowns $a_{11} \ldots a_{32}$. Multiplying out this equation we have:

$$x=(a_{11}\cdot x+a_{12}\cdot y+a_{13})/(a_{31}\cdot x+a_{32}\cdot y+1)$$

and $$y=(a_{21}\cdot x+a_{22}\cdot y+a_{23})/(a_{31}\cdot x+a_{32}\cdot y+1)$$

Each point correspondence (x,y) to (x,y) thus provides two linear equations in the unknowns $a_{11}$ to $a_{32}$. A set of k correspondences where k>4 produces an over-constrained linear system of equations. A least squares fitting method such as Single Value Decomposition can be used to determine a solution for $a_{11}$ to $a_{32}$ which best fits the observed correspondences.

Once the transform T has been determined, the captured image tiles 51,52,53 can be warped according to any of a number of known image warping techniques. See for example, "Digital Image Warping", G. Wolberg, IEEE Computer Society Press 1990.

One approach is to express the transform T as a matrix. The captured image 51 can then be warped into the corrected image 54 by first inverting matrix T to generate a reverse transform (R) 56 which maps points in the corrected image 54 to the original image 51. With reference to FIG. 4, the co-ordinates $(X_I,Y_I)$ of each pixel 158 to be assigned a value in the corrected image 54 can be transformed 56 by inverse matrix R to give the corresponding location in the original image 51. This location will not in general correspond exactly with a pixel 58 in a captured image tile 51,52,53. The image intensity at this location can be determined by one of a number of interpolation methods such as bi-linear interpolation or bi-cubic interpolation. The process is repeated for all pixel locations 158 in the corrected image 54 which, when transformed by R, are defined in the original image tiles 51,52,53. In areas of the corrected image 54 which are covered by the overlap of two or more corrected image tiles 151,152,153, the pixels 158 can be either selected from just one of the original image tiles 51,52,53, or be a blend or average of more than one of these image tiles.

Figure 5:
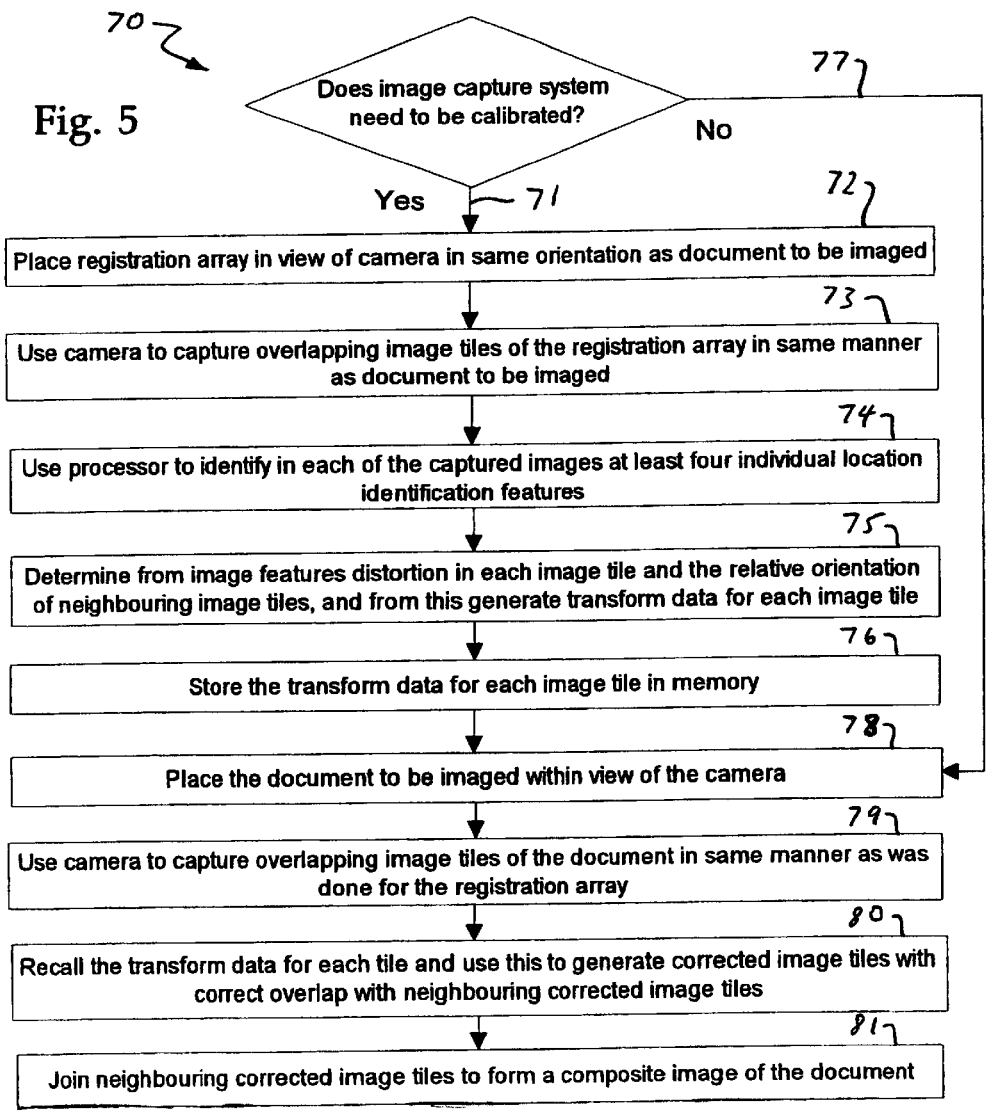
FIG. 5 is a flow chart of a preferred method according to the invention for using the image capture system to image a document.

FIG. 5 is a flowchart describing an image capture process 70 including an initialisation process in which the transform data T,R may be generated, or re-generated if required. If the image capture system 1 needs to be calibrated 71, for example during initial calibration when the image capture system is manufactured, then the registration array 60 is placed 72 in view of the camera 2 in the same orientation as the document 10 to be imaged. It does not matter if the registration array 60 is larger than the document 10, but if the registration array 60 is smaller, then it is not possible to generate a full set of transformation data T,R for each image tile 51,52,53.

Next, the camera 2 is used 73 to capture overlapping image tiles 51,52,53 of the registration array 60 in the same manner as the document 10 to be imaged.

As described above, the processor 40 is then used 74 to identify in each of the captured images 51,52,53 at least four individual location identification features 61. For greater accuracy, these at least four features should be spread over a substantial portion such as at least half of the captured image tile. Because the actual spacing and orientation of the location identification features 61 is known in advance, the transform data T,R to account for distortion and overlap of each image tile 51,52,53 can be generated 75 from the apparent location of the features 61 on the detector array 4. The calibration process is complete when the transform data T,R for each image tile 51,52,53 is stored 76 in memory 41.

Once calibration is complete, or if no calibration is needed 77, the document 10 can then be placed 78 in view of the camera 2, in the same area as was covered by the registration array 60. The camera 2 is then used 79 to capture overlapping image tiles 51,52,53 of the document 10 in the same manner as was done for the registration array 60. The transform data T is recalled 80 from memory 41 and used to generate 55 corrected image tiles 151,152,153 with the correct overlap and orientation with respect to neighbouring corrected image tiles. Finally, the corrected image tiles 151,152,153 can be joined 81 into a composite image 54 of the document 10.

The mechanism can operate at a speed comparable to a flatbed scanner. Much of the calculation can be done during the time of the mechanical movement and data transfer.

The image capture system described above provides an economical and practical solution to the problems of how to use an inexpensive electronic camera to generate a higher resolution image of a document. Image transform data is empirically derived for the system, for example using a registration array, in the same manner the system is used to image a document. In particular, an inexpensive actuator can be used as long as the positioning of the actuator is repeatable when this is moved between image tiles in a predetermined order. The achievable resolution and time taken by such a system to image a document compares favourably with a flatbed scanner, while of course work surface space can be freed for other uses when the image capture system is not in use.

What is claimed is:

1. A method of calibrating an image capture system and subsequently capturing an image of a document with the image capture system, wherein calibrating the system comprises:

providing an electronic camera for imaging a portion of a document, an actuator for moving the camera over a document support surface and for cooperating with the camera to capture a plurality of overlapping image tiles of the document at different locations over the support surface and with a predetermined degree of overlap, and electronic processing means for joining the plurality of image tiles into a composite image of the document by generating from tile data points associated with each tile a corrected array of tile data points that correct for the expected distortion and predetermined overlap of neighboring image tiles in accordance with transform data for each image tile related to the predetermined overlap and to expected distortion for each image tile;

providing a two-dimensional registration array within the field of view of the camera across an area corresponding with the document to be imaged, the registration array having a plurality of individually identifiable location identification features with a predetermined orientation and spacing amongst the features;

using the camera to capture a plurality of overlapping image tiles of the registration array at predetermined locations and predetermined overlap, the locations and overlap corresponding to those to be used with the document to be imaged, each image tile having an array of tile data points that cover a plurality of location features;

identifying for each image tile a plurality of individual location identification features, associating with the features particular tile data points and from the predetermined orientation and spacing of the specific features determining from the tile data points if there is any image distortion in that image tile; and generating the transform data for each image tile from the identity of the location identification features and the determined distortion; and wherein capturing the image subsequently comprises placing a document on the document support surface;

positioning the camera above the document support surface;

capturing a plurality of image tiles of the document at a plurality of different predetermined locations over the support surface with a predetermined degree of overlap between neighboring image tiles, each image tile having an array of tile data points and each predetermined location having a predetermined camera field of view; and causing the electronic processing means to generate from the transform data and the tile data points associated with each tile a corrected array of tile data points that correct for the expected distortion and predetermined overlap of neighboring image tiles, and to join the plurality of image tiles into a composite image of the document.

2. A method of capturing an image of a document as claimed in claim 1, wherein using the camera to capture the plurality of overlapping image tiles involves using the actuator to move the camera between image tiles in the same order as for the document to be imaged.

3. A method of capturing an image of a document as claimed in claim 1 or claim 2, wherein identifying the plurality of individual location identification features for each image tile involves identifying at least four such location identification features.

4. A method of capturing an image of a document as claimed in claim 3, wherein each image tile of the registration array has at least one unique location identification feature.

5. A method of capturing an image of a document as claimed in claim 3, wherein the location identification features are printed on a card.

6. A method of capturing an image of a document as claimed in claim 3, wherein the actuator is arranged to rotate the camera about the optical centre of the lens as the camera field of view is moved over the support surface.

7. A method of capturing an image of a document as claimed in claim 3, wherein the camera includes a focus mechanism and the transform data includes separate data for different focus settings, the method further comprising:

focusing the camera on the document; and selecting the transform data according to the focus setting.

8. A method of capturing an image of a document as claimed in claim 1 or claim 2, wherein each image tile of the registration array has at least one unique location identification feature.

9. A method of capturing an image of a document as claimed in claim 1 or claim 2, wherein the location identification features are printed on a card.

10. A method of capturing an image of a document as claimed in claims 1 to 2, wherein the actuator is arranged to rotate the camera about the optical centre of the lens as the camera field of view is moved over the support surface.

11. A method of capturing an image of a document as claimed in any of claims 1 to 2, wherein the camera includes a focus mechanism and the transform data includes separate data for different focus settings, the method further comprising:

focusing the camera on the document; and selecting the transform data according to the focus setting.

* * * * *